United States Patent [19]

Iwamura et al.

[11] Patent Number: 6,109,317

[45] Date of Patent: Aug. 29, 2000

[54] VEHICLE TIRE INCLUDING MAIN GROOVES

[75] Inventors: Wako Iwamura, Kobe, Japan; Manfred Gerresheim, Obertshausen-Hausen; Jürgen Schomburg, Rodenbach, both of Germany

[73] Assignee: Sumitomo Rubber Industries, Ltd., Hyogo-Ken, Japan

[21] Appl. No.: 09/018,896

[22] Filed: Feb. 5, 1998

[30] Foreign Application Priority Data

Feb. 14, 1997 [JP] Japan .................................. 9-030738
Mar. 3, 1997 [DE] Germany ......................... 197 08 613

[51] Int. Cl.[7] .......................... B60C 11/03; B60C 115/00
[52] U.S. Cl. ............................... 152/209.18; 152/209.28; 152/523
[58] Field of Search ....................... 152/209.18, 209.27, 152/209.28, 523

[56] References Cited

U.S. PATENT DOCUMENTS

| | | |
|---|---|---|
| 1,127,517 | 2/1915 | Richardson . |
| 4,641,696 | 2/1987 | Semin et al. . |
| 4,832,099 | 5/1989 | Matsumoto . |
| 5,421,391 | 6/1995 | Himuro . |
| 5,423,364 | 6/1995 | Himuro . |
| 5,435,366 | 7/1995 | Voigt et al. . |
| 5,725,700 | 3/1998 | Ichiki . |
| 5,759,313 | 6/1998 | Shirai et al. . |
| 5,885,384 | 3/1999 | Himuro . |

FOREIGN PATENT DOCUMENTS

| | | |
|---|---|---|
| 4-215504 | 8/1992 | Japan . |
| 6-199109 | 7/1994 | Japan . |
| 2224472 | 5/1990 | United Kingdom . |

*Primary Examiner*—Steven D. Maki
*Attorney, Agent, or Firm*—Birch, Stewart, Kolasch & Birch, LLP

[57] ABSTRACT

A vehicle tire includes a tread portion provided on each side of the tire equator with a plurality of main grooves, displaced relative to one another in the circumferential direction, extending axially outwardly from starting positions near the tire equator beyond a position at 25% of the ground contact width from the tire equator. The main grooves on each side are inclined at an acute angle which becomes greater in the course of the longitudinal extent of the main grooves.

12 Claims, 6 Drawing Sheets

VEHICLE TIRE INCLUDING MAIN GROOVES

BACKGROUND OF THE INVENTION

1. Field of the Invention

The present invention relates to a vehicle tire having a tread pattern capable of improving wet performance and decreasing tire noise.

2. Description of the Related Art

Today, the noise originating directly from a vehicle is reduced. Therefore, tire noise contributes to the total noise level of the vehicle to a higher degree. Therefore, a substantial requirement now lies in reducing tire noise.

It is known that peak values of tire noise lie in a frequency range of 900 Hz to 1100 Hz. This noise is also termed organ pipe noise, because it is a consequence of the longitudinal grooves which become active in the contact patch of the tire. An air column is formed in the longitudinal grooves between the ground contact portion of the tire and the road surface, and this produces sound in the above-mentioned frequency range as a consequence of the resonance of the air column. The wavelength of the sound is substantially constant, independently of the speed, i.e. of the speed of rotation of the tire.

In addition, the tire noise further includes so-called pumping noise generated by a high speed flow of air in the axial grooves which also activates the longitudinal grooves, and so-called pitch noise which is generated by the tread pattern elements as a consequence of their circumferential pitch arrangement.

Because noise having a frequency of about 1000 Hz is easily perceived by the human ear, such noise disturbs people both inside and outside the vehicle. In order to reduce the generation of such noise, it would be possible to reduce the proportion of the negative tread pattern (i.e. to reduce the area of grooves), because a tire becomes quieter with a reduction of the negative tread pattern. However, wet performance such as aquaplaning becomes correspondingly worse with a reduction of the proportion of the negative tread pattern, since two oppositely directed effects are present, which have previously only enabled an unsatisfactory solution.

SUMMARY OF THE INVENTION

The object of the present invention is to provide a vehicle tire which, through a special layout of the tread pattern, provides a pronounced reduction in the generation of tire noise, and which has good wet performance and good dry grip.

According to one aspect of the present invention, a vehicle tire comprises a tread portion which is provided on each side of the tire equator with a plurality of main grooves, the main grooves displaced relative to one another in the circumferential direction, in particular irregularly displaced relative to one another, the main grooves extending axially outwardly from starting positions near the tire equator beyond a position at 25% of the ground contact width from the tire equator, the main grooves on each side of the tire equator inclined in the same direction, which is reverse to the inclination of grooves on the other side, at an acute angle which becomes greater in the course of the longitudinal extent of the main grooves.

In this application, the angles of the grooves are defined as the angle between the tangent to the groove center line measured with respect to the circumferential direction of the tire.

By the avoidance of normal continuous circumferential grooves which are replaced by the obliquely extending main grooves of the present invention, it is possible to avoid so-called organ pipe noise and nevertheless to ensure the required wet performance.

In this connection it is important that the length of these special main grooves is so selected that each main groove is open at least one end in the ground contact patch, whereby required water-dissipating capability is achieved and noise generation is nevertheless minimised.

Each tread middle region can be provided with a circumferential groove consisting of sections of different cross section and/or varying width, into which the main grooves open and shoulder grooves open. As a result of the changing width of these circumferential grooves, the formation of any type of organ pipe noise is avoided, and the dissipation of water from the ground contact patch is still provided and favored.

The shoulder grooves are relatively narrow in comparison to the main grooves to form stiff blocks in the shoulder regions which ensure good handling and a low noise generation. Through the design of the groove profile or shape it is ensured that this groove profile continuously changes in the ground contact patch during rolling of the tire, which is of significance for the reduction of noise. However, an adequately large negative tread pattern is nevertheless still present in the ground contact patch which ensures the dissipation of water from the contact area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the accompanying drawings.

DESCRIPTION OF THE PREFERRED EMBODIMENTS

Figure 1:
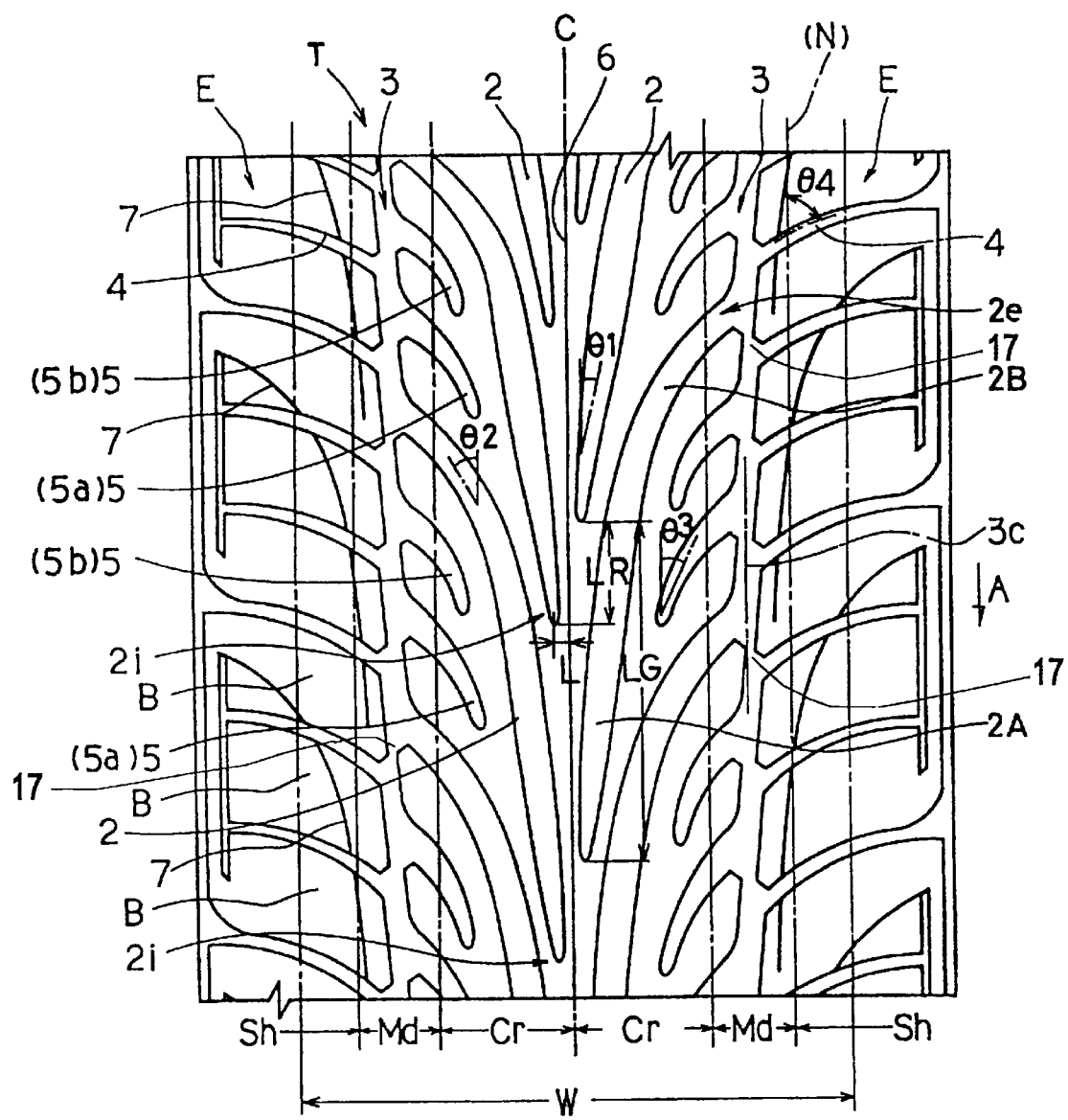
FIG. 1 is a developed plan view of an embodiment of the present invention showing an example of the tread portion.

In the drawings, a pneumatic tire according to the present invention comprises a tread portion T provided with a directionally bound tread pattern.

The tread portion T is provided on each side of the tire equator C with a circumferential groove 3. Since the circumferential grooves 3 extend continuously in the circumferential direction of the tire, they are so designed that they cannot generate any organ pipe noise.

Each of the circumferential grooves 3 consists of sections of different width and/or cross-section when considered around the circumference of the tire.

The groove width of the circumferential grooves 3 is, in the tread surface, in the range of 2 to 6%, more preferably 2 to 4% of the ground contact width W. If the width of the circumferential grooves 3 is too large, organ pipe noise is liable to be generated. If the width is too small, pumping noise increases and wet performance decreases. Usually, the minimum width is not less than 3 mm, and the maximum width is not more than 12 mm. Further, the groove depth of the circumferential grooves 3 is preferably set in the range of not less than 6 mm.

Figure 4:
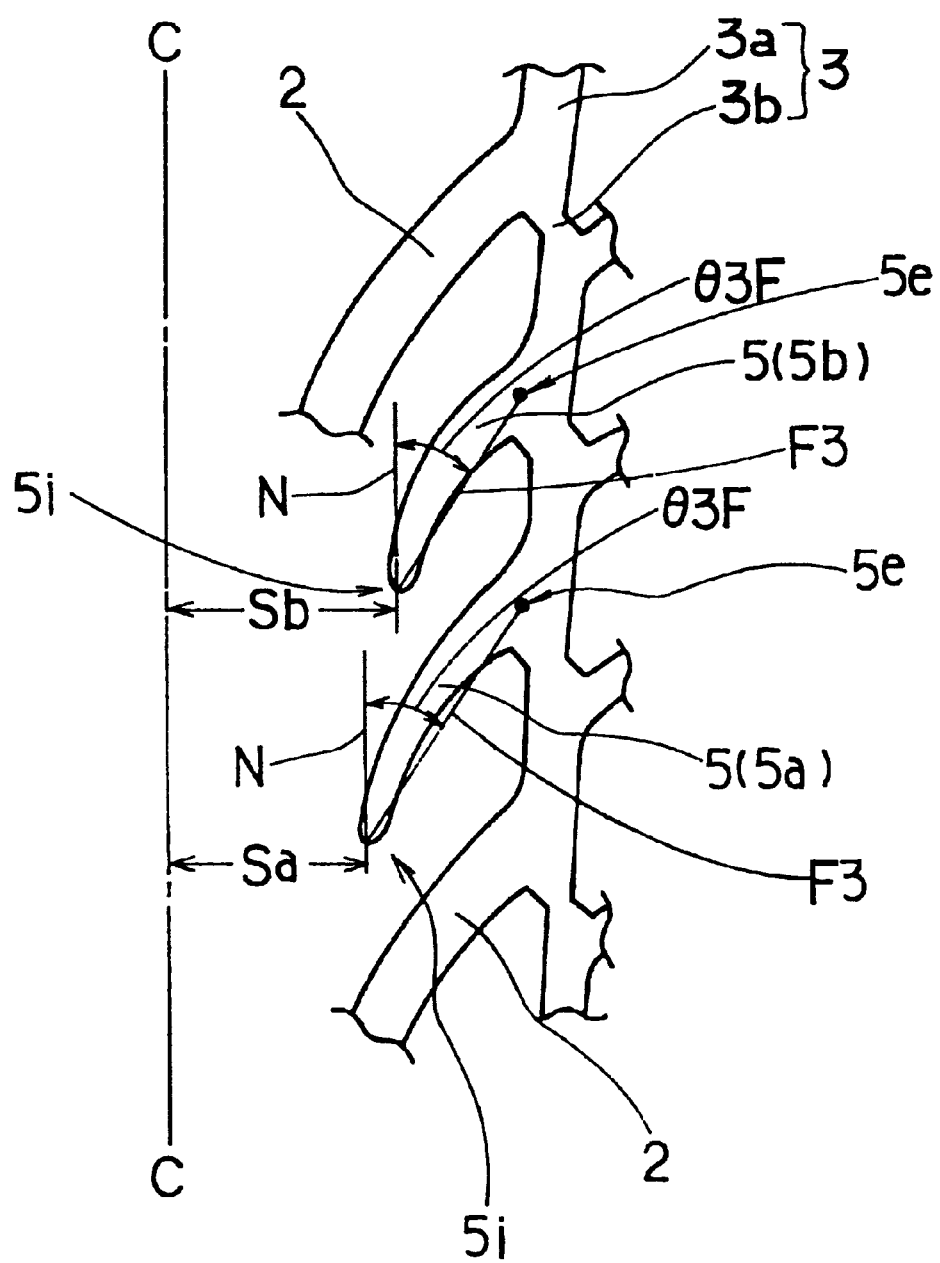
FIG. 4 is an enlarged plan view showing the auxiliary grooves of FIG. 1 and an alternative circumferential groove.

In FIG. 1, the circumferential grooves 3 have repeated narrow parts 17, but in general the circumferential grooves 3 can be considered to be straight. FIG. 4 shows another but similar example of the circumferential groove 3, in which the circumferential groove 3 can be considered to be composed of alternate oblique parts 3a and relatively short oblique parts 3b. The longer oblique parts 3a are inclined at a small angle of not more than 5 degrees, preferably 0 to 3 degrees to the tire circumferential direction, and the shorter oblique parts 3b are inclined reversely to the first oblique parts 3a at a larger angle of not more than 55 degrees, whereby the groove has a saw-tooth-like configuration. As a result, the formation of any type of organ pipe noise is completely avoided.

Preferably, the circumferential grooves 3 are disposed between a central tread region Cr and a tread shoulder region Sh such that each center line 3c is positioned within a tread middle region Md therebetween. The center line 3c is disposed in a range between 26 and 35%, more preferably between 26 and 30% of the ground contact width W.

The tread middle region Md is defined as the region between two positions which are axially spaced apart from the tire equator C by 25% and 40% of the ground contacting width W. The tread shoulder regions Sh are defined between the axially outer positions at 40% of the ground contacting width W and the tread edges E. The central tread region Cr is defined between the axially inner positions at 25% of the ground contacting width W. The ground contacting width W is defined as the maximum axial width of the ground contact patch. The ground contact patch is defined as the ground contacting area of the tread portion when the tire is mounted on a standard rim (or measuring rim), inflated to the standard inner pressure and loaded with 88% of the maximum load which are specified in the well known standards, such as ETRTO (Europe), T&RA (NorthAmerica), STRO (Scandinavia), JATMA (Japan and Asia) and the like.

The tread portion T is further provided with shoulder grooves 4 axially outwards of the circumferential grooves 3, and main grooves 2 extending on the axially inner side of the circumferential grooves 3 as will now be described.

The main grooves 2, which replace longitudinal grooves present in customary tires, start adjacent to the tire equator C with a small spacing therefrom, and extend at an acute angle into the tread middle region Md, i.e., beyond the above-mentioned position at 25% of the ground contacting width W.

Main grooves 2 are provided on each side of the tire equator C and are inclined in the same direction as each other, but reverse to the main grooves 2 on the other side. The axially outer ends 2e thereof are connected so that they are open into the circumferential grooves 3. The axially inner ends 2i thereof are closed and as stated are near the tire equator C. The axial distance L between each closed end 2i and the tire equator C is preferably set in the range of not more than 2% of the ground contact width W and not more than 10 mm. If the distance L is too large, water drainage from the tread central region deteriorates.

The main grooves 2 are displaced, preferably irregularly displaced, relative to one another in the circumferential direction as shown in FIG. 1. The displacement LR shown in FIG. 2 at the axially inner closed ends 2i is preferably set in the range of from 0.25 to 0.85, more preferably 0.35 to 0.65 times the axial distance WG of the main groove 2 to maintain the rigidity of the tread central part, especially the circumferential part between the closed ends 2i.

Further, the circumferential distances LG between the closed ends 2i of the circumferentially adjacent main grooves 2 on each side of the tire equator C, namely, the circumferential pitch lengths of the main grooves are in the range of from 1.5 to 3.5 times, more preferably 1.5 to 3.0 times the displacement LR. If the pitch lengths LG are too large, the wet performance decreases. If the pitch lengths LG are too small, the rigidity decreases between the circumferentially adjacent axially inner part 2A. The pitch lengths preferably comprise at least three, in this example five, different pitch lengths, and the pitch sequence is irregular in order to reduce the pitch noise. The ratio (PL/PS) of the maximum pitch length PL to the minimum pitch length PS is preferably set in the range of from 1.5 to 1.7, for example 1.6.

The main grooves 2 have differing widths over their length. Starting from a relatively short and narrow width part adjacent to the tire equator C, the main grooves 2 enlarge to a maximum width, and in this relatively wide part the main grooves 2 preferably have an inclination angle in the range from about 5 to 10 degrees to the circumferential direction. Thereafter, the inclination angle becomes larger and the main grooves extend with a corresponding curvature to join the circumferential grooves 3.

Figure 2:
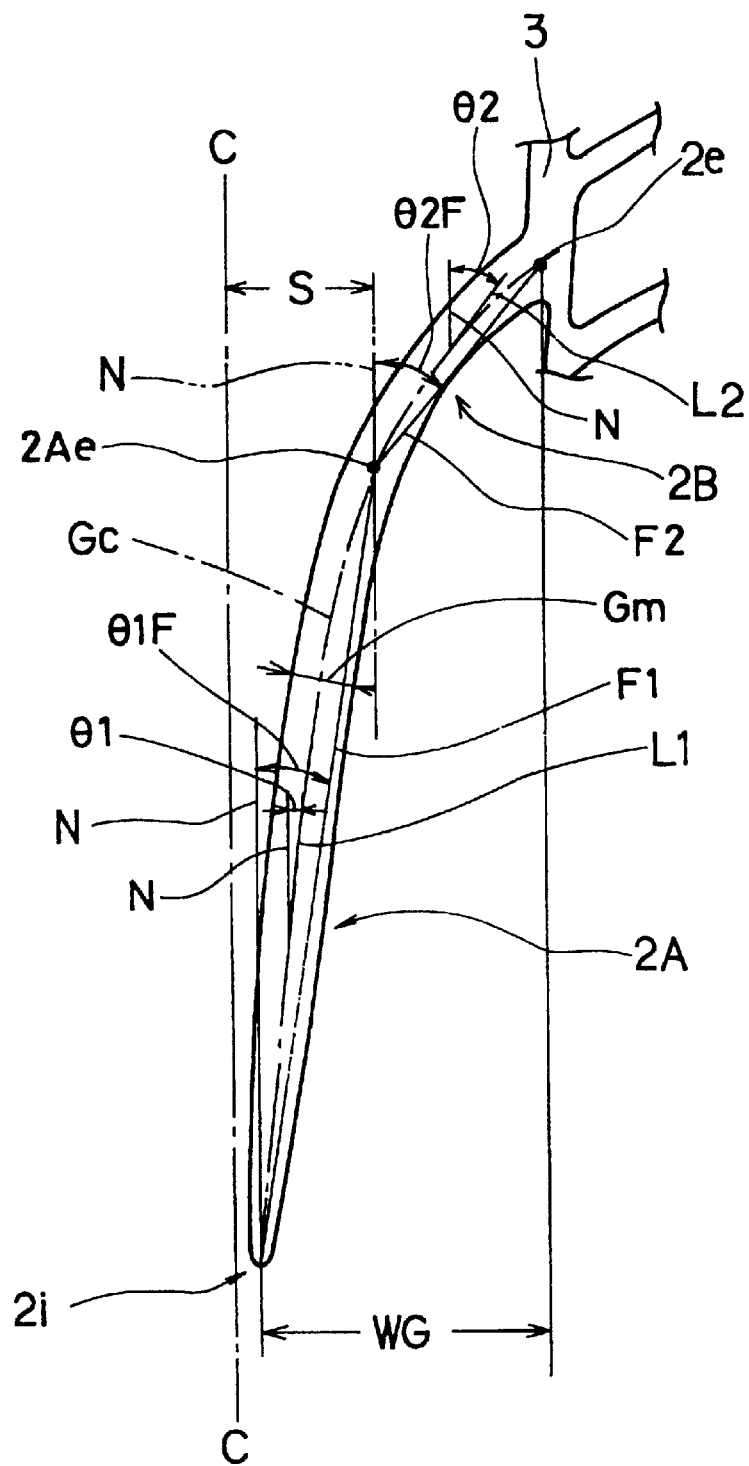
FIG. 2 is an enlarged plan view showing an example of the configuration of a single groove.

As shown in FIG. 2, when an axially inner part 2A is defined as being inclined at an angle θ1 of from 5 to 15 degrees to the tire circumferential direction, and an axially outer part 2B is defined as being inclined at an angle θ2 of more than 15 but not more than 90 degrees to the tire circumferential direction, the main groove 2 consists of the axially inner part 2A and the axially outer part 2B. The junction 2Ae of these two parts 2A and 2B is disposed at an axial distance S from the tire equator C which is in the range of from 0.25 to 0.70 times, more preferably 0.35 to 0.65 times, the axial distance WG between the inner end 2i and outer end 2e of the main groove 2. On the other hand, the distance S is in the range of from 10 to 13% of the ground contact width W in this example. As a result, each main groove provides a substantially straight and almost circumferentially extending relatively long part, which partly serves effectively as circumferential grooves present in customary tires.

The width of the main groove 2 is set in the range of from 2 to 9%, preferably 2.5 to 5.5%, more preferably 4 to 8%, still more preferably 4 to 7% of the ground contact width W. Usually, the width is not less than 6 mm and the depth of the main grooves 2 is not less than 7 mm.

The width of the main grooves 2 increases gradually from the axially inner ends 2i and reaches a maximum width Gm in the axially inner part 2A then gradually decreases to the axially outer ends 2e. In order to reduce the internal noise, it is of importance that the main grooves become narrower towards the circumferential grooves 3 in their axially outer parts 2B and are thus matched to the adjacent grooves such as the circumferential grooves and shoulder grooves. It is however possible that the width is substantially constant along the length.

Preferably, the angle θ1 of the axially inner part 2A is in the range of from 5 to 10 degrees, and the angle θ2 of the axially outer part 2B is in the range of more than 15 degrees but not more than 50 degrees. The arrangement of the axially outer parts 2B, inclined at a larger angle than the axially inner parts 2A, maintains the pattern rigidity of the central region Cr which provides good grip and steering stability. When the axially inner part 2A has an inclination angle of less than 5 degrees, it is difficult to form the necessary main grooves 2. If the angle is more than 15 degrees, the resistance to water flow increases, and wet performance is liable to deteriorate.

The axially inner parts 2A and/or the axially outer parts 2B may be at a constant inclination angle. However, it is preferable that the inclination angle of the main grooves gradually increases in both the axially inner part 2A and outer part 2B from the axially inside to outside of the tire. In this example, the angle of the axially inner part 2A increases from about 5 degrees to 15 degrees. The angle of the axially outer part 2B increases from 15 degrees to about 45 degrees.

It is also preferable that the angle θ1F of a straight line F1 drawn between the ends of the axially inner part 2A is in the range of from 5 to 15 degrees to the circumferential direction, and the angle θ2F of a straight line F2 drawn between the ends of the axially outer part 2B is more than 15 degrees but not more than 90 degrees.

Figure 3:
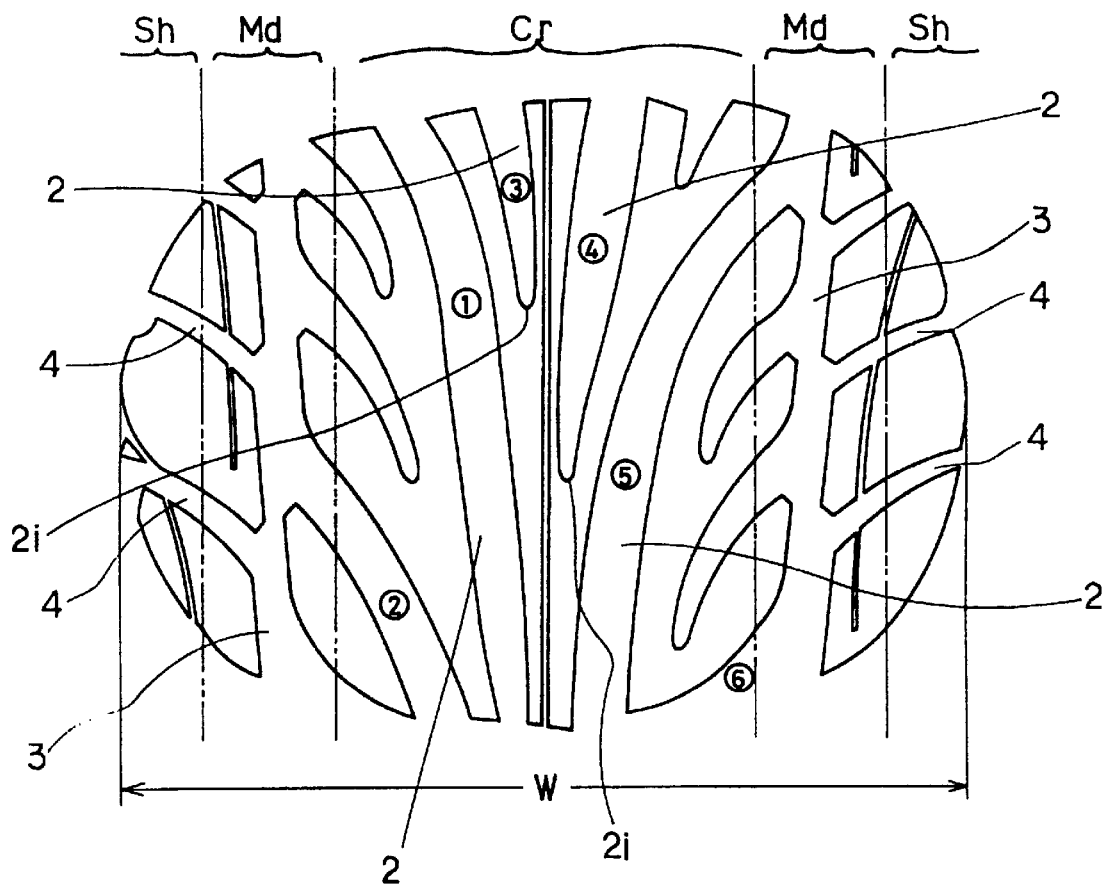
FIG. 3 shows the ground contact patch of the tire shown in FIG. 1.

As shown in FIG. 3, the main grooves 2 are arranged such that at least five, preferably six or more main grooves 2 always appear in the ground contact patch during running. In this example, six main grooves 2 appear in the ground contact patch. Further, only one main groove 2 extends circumferentially across the ground contact patch, and the remaining grooves 2 are such that the one of the inner end 2i and outer end 2e is positioned in the ground contact patch but the other is outside thereof.

The above-mentioned shoulder grooves 4, as shown in FIGS. 1 and 4, extend from the tread middle regions Md into the tread shoulder regions Sh. In this example they extend axially outwardly from the circumferential grooves 3 beyond the tread edges E, which contributes to water dissipation from the ground contact patch.

The shoulder grooves 4 are inclined at an angle θ4 of from 45 to 120 degrees, preferably 50 to 90 degrees with respect to the tire circumferential direction in the same inclining direction. The angle θ4 gradually increases axially outwards so that the shoulder grooves 4 are curved. It is however, possible that the angle θ4 is substantially constant to form a generally straight groove.

The width of the shoulder grooves 4 is less than the width of the main grooves 2 and in the range of from 3 to 7 mm for example. In this example, the width of the shoulder groove 4 gradually decreases axially outwards to reduce internal noise.

Figure 5:
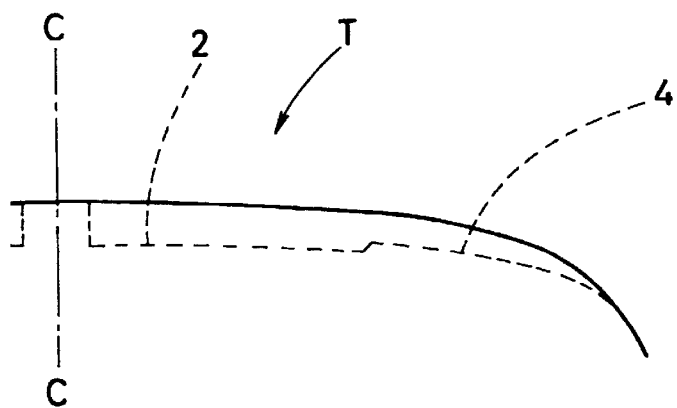
FIG. 5 shows an example of the tread profile line.

Preferably, the groove depth of the shoulder grooves 4 is less than the groove depth of the main grooves 2 to improve dry grip as shown in FIG. 5. This reduction of groove depth also functions as an additional noise reducer. Usually, the groove depth of the shoulder grooves 4 is not less than 5 mm.

The shoulder region provides the required steering stability as a result of the high proportion of positive tread pattern provided. Moreover, narrow grooves 6 ensure that no disturbing internal noises are generated despite the guarantee of dewatering.

It is possible to make the water flow from the main grooves 2 to the shoulder grooves 4 even better by setting the axially inner ends of the shoulder grooves 4 near the axially outer ends 2e of the main grooves 2. Then the main grooves 2 each open into the circumferential grooves 3 adjacent to one of the narrow parts 17, adjacent to which one of the shoulder grooves 4 opens into the circumferential groove 3. In this example, the main grooves 2 and the shoulder grooves 4 are connected to the zigzag points of the circumferential grooves 3.

Further, the tread portion is provided between the circumferentially adjacent main grooves 2 with one or more, in this example two auxiliary grooves 5a and 5b. The auxiliary grooves 5a and 5b extend axially inwardly from the circumferential grooves 3 and end in the central region Cr. The angles θ3 of the auxiliary grooves 5a and 5b are in the range of from 10 to 120 degrees, preferably 10 to 90 degrees, more preferably 10 to 50 degrees to the circumferential direction. In this example, the auxiliary grooves 5a and 5b have an oblique course approximated to the course of the main grooves 2. Thus the main grooves 2 are inclined in the same direction as the auxiliary grooves.

Further, as shown in FIG. 4, a straight line F3 drawn between the axially inner closed end 5i and the axially outer open end 5e has an angle θ3F of 10 to 120 degrees, preferably 10 to 90 degrees, more preferably 10 to 50 degrees to the circumferential direction.

The axial distances Sa and Sb of the axially inner closed ends 5i of the auxiliary grooves 5a and 5b measured from the tire equator C are preferably 0.4 to 0.75 times the axial distance WG of the main grooves 2 and 13 to 17% of the ground contact width W. If the closed ends 5i are close to the tire equator, the rigidity of the tread rubber between the main grooves 2 is too small. If the closed ends 5i are far from the tire equator, water drainage from the central region Cr is poor.

In this example, the auxiliary grooves 5a and auxiliary grooves 5b are disposed on the heel side and toe side, respectively, with respect to the designed rotational direction of the tire.

As indicated in FIG. 1 by an arrow (A), the designed direction of rotation of the tire is such that the axially inner ends 2i of the main grooves 2 first contact the road surface and then the axially outer ends 2e follow, and this designed rotational direction is marked in the tire sidewalls (not shown).

Further, in this example, the closed ends 5i of the auxiliary groove 5a on the heel side are nearer to the tire equator than the closed ends 5i of the auxiliary groove 5b on the toe side to improve drainage. The width of each auxiliary groove 5a, 5b gradually increases from the axially inner closed end to the axially outer open end from about 4 mm to about 15 mm, and the average width thereof is not less than 7 mm. The axial lengths and angles of the auxiliary grooves 5a and 5b are varied irregularly to improve the pitch noise.

Furthermore, the tread portion can be provided with narrow grooves having a width of less than 1 mm (about 0.5 mm) to determine the tread rigidity. In FIG. 1, a straight narrow groove 6 extends on the tire equator C and curved narrow grooves 7 each extend across a plurality of shoulder blocks B. The shoulder blocks B are defined by one circumferential groove 3 and the shoulder grooves 4.

Comparison Tests

Test tires were made and tested for wet performance and noise performance.

Tire size 235/45ZR17
Wheel rim size: 8JJ
Inner pressure: Front=Rear=2.2 kgf/sq.cm Wet performance test (Lateral aquaplaning test)

On a 100 meter radius test course, a 3000 cc rear-wheel-drive car provided on all four wheels with test tires was run on an asphalt paved road provided with a pool of water (depth 5 mm, length 20 m). The lateral acceleration (lateral G) was measured on the front wheels at varying speeds. In the table the average of the lateral acceleration from 50 to 80 km/h is indicated by an index based on that of a prior art tire being 100. The larger the index, the better the wet performance.

External noise test (Pass-by noise test)

According to the "Test Procedure for Tire Noise" specified in Japanese JASO-C606, a test car was coasted for a 50 meter distance at a speed of 60 km/h on a straight test course (asphalt road), and the maximum noise sound level was measured with a microphone set at a 1.2 meter height from the road surface and 7.5 meters sideways from the center line of the course. The results are indicated in decibels based on the prior art tire being set at zero.

Internal noise test (Pattern noise test)

The pattern noise heard inside the test car when running on a smooth surface road at a speed of 60 km/h was evaluated by the driver's feeling. The results are indicated by an index based on the prior art tire being 100. The larger the value, the better the pattern noise.

TABLE 1

Figure 6:
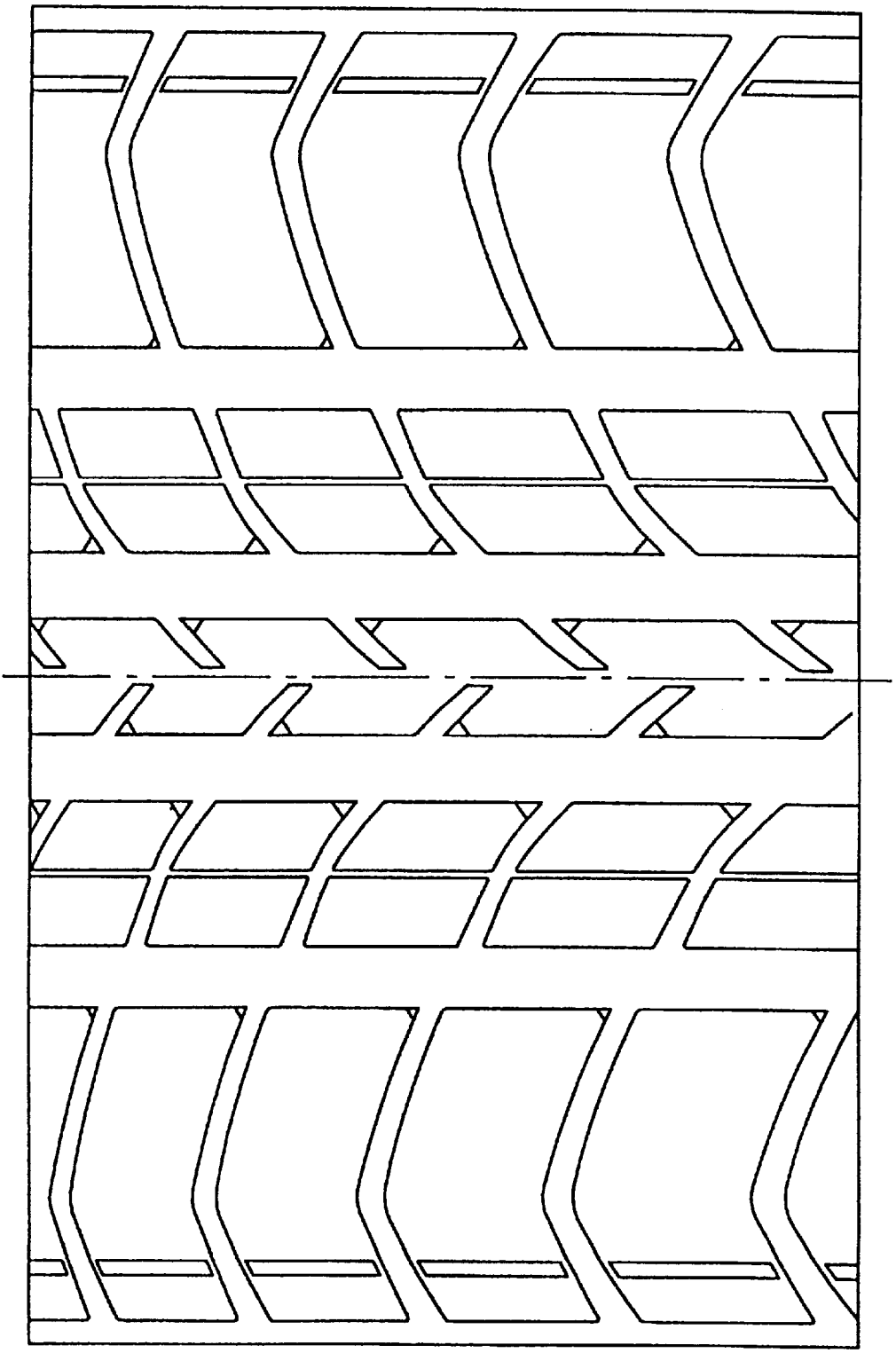
FIG. 6 shows a tread pattern according to the prior art.
Figure 7:
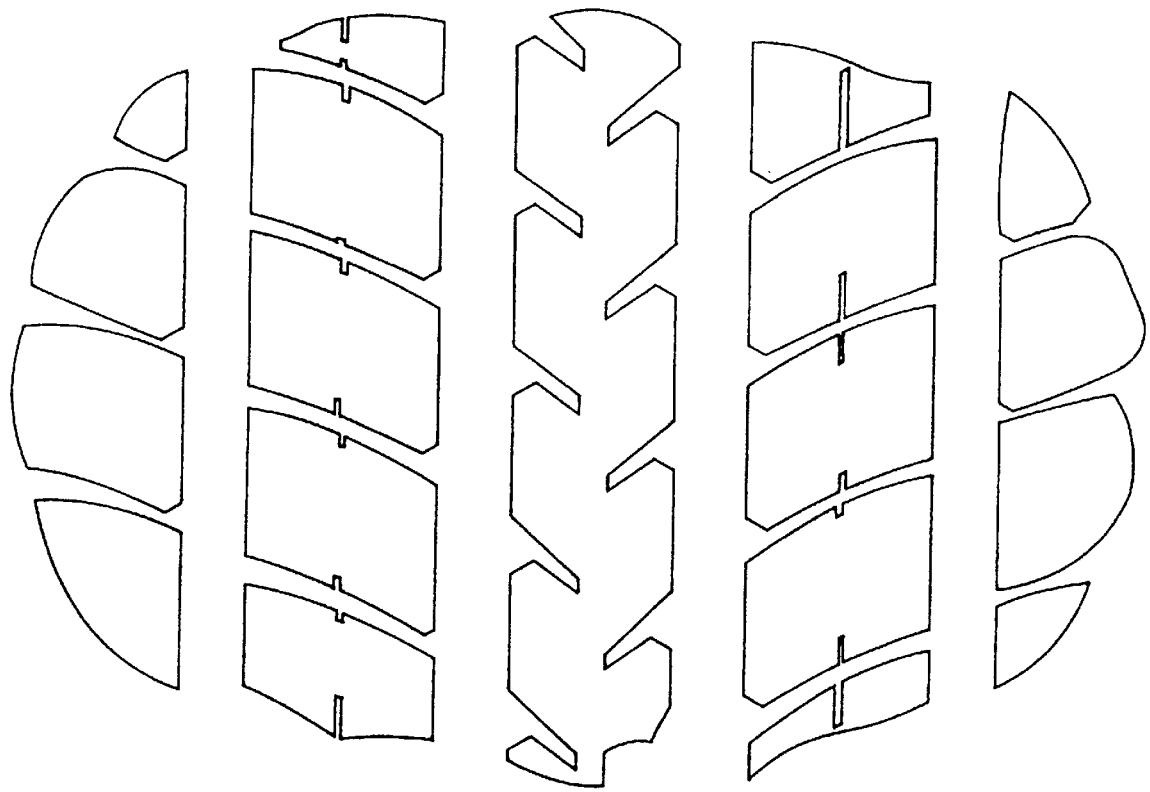
FIG. 7 shows the ground contact patch of FIG. 6.

| Tire<br>Tread | Prior<br>FIG.6 | Ex.1<br>FIG.1 | Ex.2<br>FIG.1 | Ex.3<br>FIG.1 | Ex.4<br>FIG.1 | Ex.5<br>FIG.1 | Ex.6<br>FIG.1 | Ex.7<br>FIG.1 | Ex.8<br>FIG.1 | Ex.9<br>FIG.1 | Ex.10<br>FIG.1 |
|---|---|---|---|---|---|---|---|---|---|---|---|
| Main groove Average width (mm) | — | 10 | 10 | 10 | 10 | 10 | 10 | 10 | 10 | 10 | 10 |
| $\theta 1$ (deg) | — | 5~15 | 5~15 | 5~15 | 5~15 | 5~15 | 5~15 | 5~15 | 5~15 | 5~15 | 5~15 |
| $\theta 1F$ (deg) | — | 10 | 15 | 10 | 10 | 10 | 10 | 10 | 10 | 10 | 10 |
| $\theta 2$ (deg) | — | 15~45 | 15~45 | 15~45 | 15~45 | 15~45 | 15~45 | 15~45 | 15~45 | 15~45 | 15~45 |
| $\theta 2F$ (deg) | — | 40 | 40 | 30 | 53 | 70 | 40 | 40 | 40 | 40 | 40 |
| Circumferential groove Average width (mm) | 15 | 5 | 5 | 5 | 5 | 5 | 8 | 5 | 5 | 5 | non |
| S/WG | — | 0.5 | 0.5 | 0.5 | 0.5 | 0.5 | 0.5 | 0.5 | 0.5 | 0.5 | 0.5 |
| Shoulder groove $\theta 4$ (deg) | — | 75 | 75 | 75 | 75 | 75 | 75 | 40 | 75 | 75 | 75 |
| Average width (mm) | — | 6 | 6 | 6 | 6 | 6 | 6 | 6 | 6 | 6 | 6 |
| Auxiliary groove Number* | — | 0 | 0 | 0 | 0 | 0 | 0 | 0 | 2 | 2 | 0 |
| $\theta 3$ (deg) | — | — | — | — | — | — | — | — | 40 | 40 | — |
| Sa/WG | — | — | — | — | — | — | — | — | 0.65 | 0.59 | — |
| Sb/WG | — | — | — | — | — | — | — | — | 0.65 | 0.72 | — |
| Test Results | | | | | | | | | | | |
| Wet performance (index) | 100 | 115 | 112 | 116 | 113 | 109 | 118 | 119 | 121 | 122 | 112 |
| External noise (dB) | 0 | −1 | −1.1 | −0.9 | −1.1 | −1.2 | −0.8 | −0.8 | −1 | −1 | −0.3 |
| Internal noise (index) | 100 | 110 | 109 | 112 | 107 | 106 | 110 | 105 | 108 | 109 | 102 |

| Tire<br>Tread | Ex.11<br>FIG.1 | Ex.12<br>FIG.1 | Ex.13<br>FIG.1 | Ex.14<br>FIG.1 | Ex.15<br>FIG.1 | Ex.16<br>FIG.1 | Ex.17<br>FIG.1 | Ex.18<br>FIG.1 | Ex.19<br>FIG.1 | Ref.1<br>FIG.1 |
|---|---|---|---|---|---|---|---|---|---|---|
| Main groove Average width (mm) | 10 | 10 | 10 | 10 | 10 | 10 | 10 | 10 | 10 | 10 |
| $\theta 1$ (deg) | 5~15 | 5~15 | 5~15 | 5~15 | 5~15 | 5~15 | 5~15 | 5~15 | 5 | 20 |
| $\theta 1F$ (deg) | 10 | 10 | 10 | 10 | 10 | 10 | 10 | 8 | — | — |
| $\theta 2$ (deg) | 15~45 | 15~45 | 15~45 | 15~45 | 15~45 | 15~45 | 15~45 | 15~45 | 40 | 40 |
| $\theta 2F$ (deg) | 40 | 40 | 40 | 40 | 40 | 45 | 45 | 45 | — | — |
| Circumferential groove Average width (mm) | 5 | 12 | 15 | 3 | 5 | 5 | 5 | 5 | 5 | 5 |
| S/WG | 0.5 | 0.5 | 0.5 | 0.5 | 0.5 | 0.5 | 0.5 | 0.5 | — | — |
| Shoulder groove $\theta 4$ (deg) | 40 | 75 | 75 | 75 | 75 | 75 | 75 | 60 | 75 | 75 |
| Average width (mm) | 6 | 6 | 6 | 6 | 6 | 6 | 6 | 6 | 6 | 6 |
| Auxiliary groove Number* | 0 | 0 | 0 | 0 | 2 | 2 | 1 | 2 | 0 | 0 |
| $\theta 3$ (deg) | — | — | — | — | 40 | 40 | 40 | 40 | — | — |
| Sa/WG | — | — | — | — | 0.4 | 0.75 | 0.75 | 0.59 | — | — |
| Sb/WG | — | — | — | — | 0.4 | 0.75 | — | 0.72 | — | — |
| Test Results | | | | | | | | | | |
| Wet performance (index) | 110 | 119 | 121 | 109 | 120 | 124 | 118 | 123 | 118 | 98 |
| External noise (dB) | −1 | −0.4 | −0.1 | −1.1 | −1 | −1 | −1 | −0.9 | −0.7 | −1 |
| Internal noise (index) | 103 | 105 | 105 | 111 | 108 | 107 | 109 | 108 | 109 | 104 |

*The number counted between the adjacent two main grooves.

From the test results, it was confirmed that the tires according to the present invention were improved in both wet performance and noise performance.

In summary, the main grooves lying in the ground contact patch were able to take up a large quantity of water and to dissipate it sideways and outwardly.

The course of the grooves continuously changed in the ground contact patch during running, and no straight through-going grooves were present, whereby undesired organ pipe noise was avoided and there was no deterioration of wet performance. Also the internal noise was reduced.

For the manufacture of a tire in accordance with the invention, three different types of segments and five different lengths are preferably used, with the ratio between the shortest and longest segment preferably amounting to about 1:1.6.

The present invention can be suitably applied to belted radial tires for passenger cars especially tires whose aspect ratio is not more than 60%. As described above, in the present invention, the optimisation of good aquaplaning behaviour with a simultaneous reduction of tire noise is obtained through the selected arrangement and dimensioning, and also through the shape of the grooves and the offset which takes place at least over the width of the tread.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A vehicle tire comprising:

a tread portion and a tire equator;

a plurality of main grooves provided on each side of the tire equator, said main grooves on one side of the tire equator being displaced relative to said main grooves on the other side of the tire equator in a circumferential direction and each of said main grooves extending axially outwardly from starting positions near the tire equator beyond a position at 25% of the ground contact width from the tire equator, each of said plurality of main grooves on each side of the tire equator being inclined in the same direction at an acute angle to the circumferential direction, said acute angle increasing along a longitudinal extent of each of said plurality of main grooves, the inclination of said main grooves on one side of the tire equator being reverse of the inclination of said main grooves on the other side of the tire equator;

wherein a number of said plurality of main grooves around a circumference of the tire is selected so that at least part sections of at least five of said plurality of main grooves are disposed in the ground contact patch, said at least five of said plurality of main grooves each have one end outside the ground contact patch, one of said at least five of said plurality of main grooves extends circumferentially across the ground contact patch, and a remainder of said at least five of said plurality of main grooves each have one end within the ground contact patch and another end outside the ground contact patch;

on each side of the tire equator, the tread portion is provided with a circumferential groove extending continuously in the circumferential direction and consisting essentially of sections of different cross-section, each of said plurality of main grooves opens into a respective circumferential groove at axially outer ends thereof, and the tread portion is further provided with shoulder grooves extending axially outwardly from the circumferential grooves to tread edges, and inclined at an angle of from 45 to 120 degrees with respect to the tire circumferential direction, and being narrower than said plurality of main grooves.

2. The tire according to claim 1, wherein each of said plurality of main grooves has an axially inner closed end.

3. The tire according to claim 1, wherein a tire tread region between axially inner ends of said plurality of main grooves on each side of the tire equator comprises tread only and no circumferentially extending groove.

4. The tire according to claim 1, wherein an axial distance of axially inner ends of said plurality of main grooves from the tire equator is in a range of not more than 2% of the ground contact width, each of said plurality of main grooves consists of an axially inner part inclined at an angle in a range of from 5 to 15 degrees with respect to the circumferential direction and an axially outer part inclined at an angle in a range of more than 15 degrees but not more than 90 degrees with respect to the circumferential direction, and a boundary between the axially inner part and the axially outer part is disposed at an axial distance from the tire equator in a range of from 0.25 to 0.70 times an axial distance between the axially inner end and an axially outer end of a respective main groove.

5. The tire according to claim 1, wherein a width of each of said plurality of main grooves increases along said longitudinal extent, starting from a narrowest axially inner end in a vicinity of the tire equator and decreases again towards an axially outer end thereof.

6. The tire according to claim 1, wherein each of the circumferential grooves consist essentially of sequential sections having varying width, each of said sequential sections being connected together via narrow parts.

7. The tire according to claim 1, wherein each of the circumferential grooves are the only grooves which extend continuously in the circumferential direction, and each of the circumferential grooves is disposed in a tread middle region defined between two positions each of which are axially spaced apart from the tire equator by 25% and 40% of the ground contacting width.

8. The tire according to claim 7, wherein an indication of design direction of tire rotation is provided on the tire and the axially inner ends of the main grooves first contact with the road surface and the axially outer ends follow.

9. The tire according to claim 1, wherein each of the circumferential grooves has a width in the range of from 2 to 40% of the ground contact width.

10. The tire according to claim 1, wherein the inclination angles of the shoulder grooves are in the range of 50 to 90 degrees with respect to the tire circumferential direction.

11. The tire according to claim 1, wherein said plurality of the main grooves each open into a respective circumferential groove adjacent to one of the narrow parts, adjacent to which one of the shoulder grooves opens into the circumferential groove.

12. The tire according to claim 1, wherein the tread portion is provided in each part between circumferentially adjacent main grooves with at least one auxiliary groove which extends axially inwardly from one of the circumferential grooves and ends in said part between the circumferentially adjacent main grooves and has an oblique course approximated to a course of each of the circumferentially adjacent main grooves.

* * * * *